United States Patent Office 3,489,775
Patented Jan. 13, 1970

3,489,775
EPOXIDATION OF OLEFINIC COMPOUNDS
Irénée Seree de Roch, Rueil-Malmaison, and Pierre Menguy, L'Etang-la-Ville, France, assignors to Institut Francais du Petrole, des Carburants et Lubrifiants, Rueil-Malmaison, France
No Drawing. Filed Jan. 13, 1967, Ser. No. 608,986
Claims priority, application France, Feb. 12, 1966, 49,429
Int. Cl. C07d 1/08
U.S. Cl. 260—348.5                    15 Claims

ABSTRACT OF THE DISCLOSURE

Epoxidation of olefinic compounds using as a catalyst a salt of a nitrogenous organic base with a molybdic, tungstic, or vanadic acid.

---

This invention relates to the epoxidation of olefinic compounds in the liquid phase, and more particularly to such a process which is conventional except for the use of particular catalysts.

For the epoxidation of olefins, it has been proposed, heretofore, to employ catalysts such as molybdic, tungstic, or vanadic acid, or the mineral salts thereof. However, these catalysts were relatively ineffective in accelerating the rates of reaction.

It is a principal object of this invention, therefore, to provide an improved process based on different catalysts which, though similar to prior art catalysts, result in an unexpected increase in reaction rates.

Upon further study of the specification and claims, other objects and advantages of the present invention will become apparent.

For the attainment of the objects of this invention, there is provided an epoxidation process which comprises reacting an olefinic compound in the liquid phase with an epoxidation agent in the presence of a catalytic quantity of a catalyst comprising, as an essential catalytic component, a salt of an acid of molybdenum, tungsten, or vanadium, with a nitrogenous organic base. By using this type of catalyst, not only are the reaction rates substantially increased, but also improved yields are obtained on occasion.

As the epoxidizing agent, it is possible to use inexpensive reagents, such as pure or diluted oxygen. However, the best results are obtained with an organic peroxide containing, for example, 1–30, preferably 4–12 carbon atoms. Particularly good results are obtained with hydroperoxides of hydrocarbons, alcohols, esters, aldehydes, or acyl moieties.

Among the various hydrocarbon hydroperoxides that can be utilized, there are to be mentioned hydroperoxides of aliphatic hydrocarbons, cycloaliphatic hydrocarbons, or alkyl aromatic hydrocarbons. Specific examples of the foregoing generic groups include, among others, the following:

cyclohexene hydroperoxide,
tert.-butyl hydroperoxide,
methyl-4-pentene-2 hydroperoxide,
methyl-2-pentene-2 hydroperoxide,
cyclohexane hydroperoxide,
cumene hydroperoxide, and
ethyl benzene hydroperoxide.

As aliphatic hydroperoxides, there can even be employed polyolefinic hydroperoxides, such as, for example, polybutadiene hydroperoxide, or polyisoprene hydroperoxide. As specific examples of alcohol hydroperoxides, there are included, among others, the following: cyclohexanol hydroperoxide, methylphenyl carbinol hydroperoxide, and benzohydrol hydroperoxide.

Acyl hydroperoxides are very common epoxidation agents, particularly the organic peracids, such as performic, peracetic, perbutyric, pervaleric, perbenzoic, and perphthalic acid. Generally speaking, it is likewise possible to employ alkanoic, cycloalkanoic, aromatic, and heterocyclic peracids in the same manner.

Specific examples of aldehyde hydroperoxides include, among others: aldehyde peracylates, particularly acetaldehyde peracetate, and butyraldehyde perbenzoate.

Of all the previously mentioned peroxides, the most preferred group is the group of hydrocarbon hydroperoxides because they are particularly specific as epoxidation agents when reacted with olefins.

It has also been discovered that a hydroperoxide is especially useful when employed in the form of its raw reaction product, i.e., from the oxidation of a hydrocarbon or an alcohol, preferably an alkyl benzene or an $\alpha$-hydroxyalkyl benzene in the liquid phase with molecular oxygen. With respect to these alkyl benzenes or hydroxyalkyl benzenes, the alkyl radical branched on the benzene ring contains preferably 2–12 carbon atoms, and the preferred embodiment is the ethyl radical.

For the production of this raw product, the molecular oxygen can be employed in a pure or diluted form, for example, as air. The reaction temperature is about 80–150° C., and the reaction pressure is about 1–50 kg./cm.$^2$ absolute. In order to obtain a hydroperoxide solution which is especially selective for the epoxidation of olefins, it is desirable to maintain a conversion rate of lower than 30% preferably about 2–20% in the formation of the hydroperoxide itself. This low conversion rate is accompanied by the formation of small quantities of other oxygenated byproducts. For example, in a reaction wherein ethyl benzene is the hydrocarbon starting material, there are formed such byproducts as acetophenone, methylphenyl carbinol, phenyl-1-hydroxy-1-hydroperoxy-1-ethane, and benzoic acid. The surprising characteristic of these byproducts is that one, if not more of them exhibit a favorable influence on the selectivity of the hydroperoxide in the subsequent reaction with the olefin. This has been discovered by observing that the raw reaction product in the formation of the hydroperoxide yields better results than the pure hydroperoxide.

On the other hand, if one desires to isolate the hydroperoxide, it can be accomplished by conventional methods by treating the raw reaction product with soda at a temperature of —5 to 15° C. The hydroperoxide is finally liberated from the sodium salt thereof by treatment of same in suspension in a solvent, such as pentane, with a solution of an acid, such as, for example, hydrochloric acid. After the hydroperoxide solution is washed to a pH of about 6, the residual pentane is evaporated, thereby resulting in a hydroperoxide having a purity of about 90–95%. Thus, the hydroperoxide can be employed in either the pure or unpurified state.

As the starting olefinic reaction, it is theoretically possible to employ any olefinic compound, since the epoxidation agent of this invention will attack the double bond in every case. Consequently, the process of the present invention is applicable to relatively short-chain olefins, for example, of 3–35 carbon atoms, or actually polymeric materials having thousands of carbon atoms.

As examples of the short-chain olefins, there can be used such diverse materials as:

(a) Aliphatic olefins, such as propylene, butenes, isobutene, hexenes, methyl-4-pentene-2, etc.;
(b) Cycloolefins, for example, cyclopentene, cyclohexene, cyclooctene, etc.;
(c) Alkyl and alkenyl cycloolefins, for example, methyl cyclohexene, methyl cyclopentene, vinyl cyclohexene, etc.;

(d) Alkenylaryl hydrocarbons, for example, styrene, vinyl toluene, methyl styrene, etc.;

(e) Compounds having a plurality of olefinic double bonds, conjugated and unconjugated, for example, cyclooctadiene-1,5 cyclododecatriene-1,5,9, cyclohexadiene-1,4, cyclohexadiene-1,3, butadiene, etc.; and (f) Olefinic alcohols, for example, allyl alcohol, methyl vinyl carbinol, cyclohexenol, etc.

As typical examples of polymeric materials which can be employed as the olefinic starting material, conjugated poly diolefins, such as polybutadiene and polyisoprene, are particularly amenable to this process.

CATALYSTS

The catalysts of the present invention can be produced, starting with any of the tungstic acids, molybdic acids, vanadic acids, or salts thereof. Likewise, there can also be used heteropolyacids containing tungsten, molybdenum, or vanadium, or salts thereof.

As preferred embodiments of the acids of this invention which can form salts with organic nitrogenous bases to produce the desired catalysts of this invention, there are included among others; tungstovanadic acid, molybdovanadic acid, phosphomolybdic acid, selenomolybdic acid, thiomolybdic acid, borotungstic acid, molybdotungstic acid, phosphotungstic acid, tungstomolybdobric acid, and silicotungstic acid.

All of the precedingly described acids are characterized by having an anionic portion containing at least one metal selected from the group consisting of tungsten, vanadium, and molybdenum, and optionally, in addition, such elements as S, Se, Te, P, As, Si, and B. In these acids, the valence of tungsten, vanadium, or molybdenum is equal to at least 5.

With respect to the organic nitrogenous base which is a component of the catalysts of this invention, there can be used such diverse materials as aliphatic, cycloaliphatic, or aromatic mono- or polyamines, quaternary ammonium bases, or heterocyclic nitrogenous bases. These bases advantageously contain about 1–50 carbon atoms per molecule, preferable 5–25, but these limits are in no way critical.

As preferred embodiments of the organic nitrogenous bases of this invention, there are included, among others:

monomethylamine,
trimethylamine,
diethylamine,
dihexylamine,
hexadecylamine,
cyclohexylamine,
ethylenediamine,
hexylenediamine,
diethanolamine,
triethanolamine,
guanidine,
p-phenylenediamine,
tetramethylammonium hydroxide, and
phenyltrimethylammonium hydroxide.

o-toluidine,
piperidine,
pyrrolidine,
piperazine,
pyridine,
quinoline,
amino-4-quinoline,
aniline,
benzidine,
dimethylaniline,
diphenylamine, The following catalysts are particularly preferred:
pyridine tetramolybdate,
piperidine dimolybdate,
diethylamine paramolybdate,
piperidine paramolybdate,
hexadecylamine trimolybdate,
piperidine trimolybdate,
piperidine tetramolybdate,
piperidine metavanadate,
pyridine metavanadate,
monomethylamine heptatungstate,
piperidine heptatungstate,
toluidine pentatungstate,
pyridine phosphotungstate,
quinoline molybdotungstate,
piperidine boromolybdate,
diethanolamine silicomolybdate,
piperazine tungstovanadate,
triethylamine selenotungstate,
cyclohexylamine thiomolybdate, and
benzyltrimethylammonium dimolybdate.

Among the above compounds, it has been found that the most highly active catalysts are those of molybdenum, and particularly pyridine molybdate and piperidine molybdate.

The catalysts of this invention can be prepared according to conventional methods described in the literature, for example, A. C. Krause and F. C. Krauskopf, JACS, 1925, pp. 1689–1694; or J. Bye and M. J. Neill, Bulletin de la Societe Chimique de France (Bulletin of the French Chemical Society), 1960, pp. 1130–1138. These conventional methods, in brief, comprise the reaction of a tungstic, molybdic, or vanadic acid with a nitrogenous base, preferably in a solvent, such as, for example, water, alcohol, or a water-alcohol mixture. Alternatively, the reaction can be conducted by reacting a salt of one of the acids, for example, a sodium or ammonium salt, with a salt of one of the bases, for example, a hydrochloride or sulfate of an amine or a heterocyclic base.

Although it is preferred to employ the catalysts of the present invention as the sole catalysts in the reaction, it is unnecessary to exclude catalysts which have been known to be used heretofore. Consequently, this invention covers any process wherein a catalytic quantity of the catalysts of this invention is employed to catalyze the epoxidation reaction to a finite extent.

The epoxidation reaction can be conducted in the presence of inert solvents, such as, for example, benzene, dichlorobenzene, alcohols, and alkanoic acids. The presence of water should be avoided, and in particular, it is very advantageous to take precautions that less than 10% by weight of the liquid phase is water, preferably less than 1% by weight.

The reaction temperature for the epoxidation is about 0–210° C., preferably about 25–190° C., with the best results at a temperature of about 60–120° C. Any pressure can be employed as long as a liquid phase is maintained.

The proportions of the reactants for the epoxidation are selected in proportion to the desired degree of conversion of the olefinic compound, taking into account that one mol of monoperoxide can be used to epoxidize one mol of a monoethylenically unsaturated compound. In any case, it is desirable to employ the unsaturated compound in a large excess in relationship to the peroxide employed, e.g., about 2- to 6-fold, in mols. On the other hand, if the epoxidation agent is oxygen, it is preferred to employ an excess of the latter.

As indicated previously, the catalyst must be employed in a catalytic amount, of course, but it is preferred to employ about 0.005–2% by weight, based on the weight of the liquid phase. In the resultant reaction product, not only epoxides are recovered, but also when organic peroxides are employed, the reduction product of these peroxides, for example, alcohols, ketones, or acids, depending upon whether the hydroperoxide is one of a hydrocarbon, alcohol, or acyl. These various reaction products can be fractionated by conventional methods, e.g., fractional distillation.

At the completion of the reaction, in that case wherein ethyl benzene hydroperoxide is employed, there is obtained on the one hand, an epoxide corresponding to the unsaturated compound employed as the starting material, and on the other hand, there is obtained phenyl methyl carbinol, which is a starting material for the production of styrene by dehydration.

Aside from phenyl methyl carbinol, there is also produced a minor proportion of acetophenone, about 10–15% by weight of the phenyl methyl carbinol produced;

moreover, the acetophenone can be converted into phenyl methyl carbinol by hydrogenation. Consequently, by the use of ethyl benzene hydroperoxide, it is possible to obtain overall molar yields of phenyl methyl carbinol of about 92–96%. Thus, for a chemical complex wherein it is desired to manufacture epoxides, on the one hand, and styrene, on the other, a highly unique solution to this problem is in the employment of ethyl benzene hydroperoxide as the epoxidation reagent.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE I

To 150 g. of a solution titrating as 74% ethyl benzene hydroperoxide, there are added 0.2 g. of piperidine paramolybdate of the formula $Mo_7O_{24}(C_5H_{12}N)_6$ and 90 g. of propylene.

After two hours of agitation at 95° C., 97% of the hydroperoxide is converted, thereby forming 42.5 g. of epoxy-1,2-propane, the molar selectivity being 97%, based on the propylene consumed.

EXAMPLE II

Example I is repeated, except that, as the catalyst, there is employed pyridine tetramolybdate of the formula $Mo_4O_{13}(C_5H_6N)_2$, in a concentration of about 0.2 g. per 150 g. of a 74% ethyl benzene hydroperoxide solution. After two hours, 93% of the hydroperoxide is converted, thereby forming 41 g. of epoxy-1,2-propane, the molar selectivity being 97%, based on the propylene consumed.

EXAMPLE III

To 200 g. of a solution of cyclohexenyl hydroperoxide in cyclohexene, the hydroperoxide content being 17% by weight, there are added 0.28 g. of piperidine paramolybdate. After 1¼ hours at 70° C., 98% of the hydroperoxide is converted, and as the desired reaction product, 22.3 g. of epoxy-1,2-cyclohexane is recovered.

EXAMPLE IV

To 187 g. of a solution of cyclohexen-2-ol-1 containing 12% by weight of 1-hydroxy-1-hydroperoxy-cyclohexene-2, there are added 0.175 g. of pyridine tetramolybdate. After the reaction solution has been agitated for 2½ hours at 80° C., 93% of the hydroperoxide is converted, thereby forming 15.4 g. of 1,2-epoxy-cyclohexanol-3, corresponding to a molar yield of 85% in relationship to the hydroperoxide consumed. The cyclohexene-2-one-1 which is obtained as a by-product represents about 96% of theory.

EXAMPLE V

To a cumene solution containing 82% by weight of cumene hydroperoxide, there are added 0.1 g. of piperidine matavanadate of the formula $HVO_3, C_5H_{11}N$, the amount of the cumene solution being 110 g. Furthermore, there are added 126 g. of cyclooctene-cis. After ½ hour of agitation at 60° C., 90% of the original hydroperoxide is consumed. The resultant solution then contains 38 g. of 1,2-epoxy-cyclooctane, corresponding to a molar yield of 56% in relationship to the consumed hydroperoxide. The molar yield in a relationship to cyclooctene consumed is about 94%.

The preceding examples can be repeated with other olefins and other hydroperoxides, as described specifically and generically in the description of the invention. For example, the hydroperoxide of phenyl-2-butane leads to an epoxide and to phenyl-2-butanol-2, and the latter can be dehydrated to phenyl-2-butene-2.

EXAMPLE VI

To 1 liter of a cyclohexene solution of cyclohexene-2-yl-1 hydroperoxide, having a hydroperoxide concentration of 148 g./l., there are added 0.2 g. of piperidine paramolybdate $[Mo_7O_{24}(C_5H_{12}N)_6]$. The reaction is conducted at 70° C., and after two hours, 92% of the hydroperoxide is consumed, thereby forming 1.03 mols of 1,2-epoxy-cyclohexane and 0.14 mol of 2,3-epoxy-cyclohexanol, the over-all selectivity to epoxide being 98%, based on the hydroperoxide consumed.

EXAMPLE VII

A solution of polybutadiene, having an average molecular weight of 1500, in ethyl acetate, the concentration being 160 g. of polymer per liter, is subjected to autooxidation with molecular oxygen. By measuring iodometrically, it is calculated that the fixed oxygen in the form of the hydroperoxide amounts to a hydroperoxide concentration of about 0.242 mol/liter. To this solution of peroxide, there are added 0.2 g./l. of piperidine paramolybdate, and the reaction temperature is raised to 75° C. After the hydroperoxide concentration is reduced to less than 0.056 mol/liter, the epoxide content is determined by the conventional method (HCl, dioxane). The resultant epoxide concentration is 0.157 mol/liter, corresponding to the hydroperoxide consumed of a yield of 85%.

EXAMPLE VIII

The epoxidation of octene-1 is conducted by reacting the latter with acetyl hydroperoxide (peracetic acid) under the following conditions:

56 g. of octene-1 in 350 g. of benzene are reacted at 25° C. with 11.5 g. of peracetic acid in acetic acid, the total quantity of the hydroperoxide and acetic acid being 30 g. The reaction is conducted in the presence of 0.3 g. of piperidine paramoblydate.

After 5 hours, 70% of the peracid is converted. The resultant 1,2-epoxy-octane is measured directly by gas chromatography, and the selectivity of the reaction to this final product is 92.7% in relationship to the peracid consumed.

EXAMPLE IX

At 150° C., gaseous oxygen is employed to oxidize 160 g. of methyl-2-pentene-2 in the presence of 0.2 g. of piperidine metavanadate $[C_5H_{11}NHVO_3]$ and 5 g. of pyridine tetramolybdate $[Mo_4O_{13}(C_5H_6N)_2]$. At the end of 4 hours, the conversion is 16%. The oxidation products contain 10.5 g. of 2,3-epoxy-2-methyl-pentane, corresponding to a selectivity to the epoxide of 35%.

EXAMPLE X

To 370 g. of 2,4,4-trimethyl-pentane-1, there are admixed 100 g. of 2,3-dimethyl-butane. The catalyst comprises 0.1 g. of piperidine metavanadate, to which there are added 1.5 g. of molybdenum stearate. The oxidation reaction is conducted at 125° C. with oxygen under a pressure of 35 kg./cm.² absolute. After 1½ hours, 15% of the olefinic hydrocarbon is converted. The selectivity to 1,2-epoxy-2,4,4-trimethyl-pentane is 40%.

EXAMPLE XI

At 135° C., a mixture of ethyl benzene and propylene is oxidized with molecular oxygen, the molar ratio of ethyl benzene to propylene being about 4. The catalyst is employed in the form of molybdenum tetrapyridine (1 g.), and tungstic anhydride (0.2 g.). After two hours, 5% of the ethyl benzene, and 7% of the propylene, are converted; the selectivity to 1,2-epoxy-propane is 45%, and the selectivity to acetophenone plus methyl phenol carbinol is 88%, the molar ratio of acetophenone to methyl phenyl carbinol being about 4.

EXAMPLE XII

This example is for purposes of comparison, and demonstrates the new and unexpected results of the present invention.

A solution containing 95 g. of cumene hydroperoxide, 155 g. of octene-1, and 0.1 g. of $V_2O_5$ is heated to 110° C. After 12 hours, 80% of the hydroperoxide is converted, and there are produced 19 g. of 1,2-epoxy-octane. If the same experiment is repeated, but at 50° C., and for a period of only 1 hour, there are obtained only slight traces of the epoxide.

On the other hand, by repeating the experiment at 50° C., and using as the catalyst 0.1 g. of piperidine metavanadate, 95% of the hydroperoxide is converted after 1 hour. Furthermore, the yield of 1,2-epoxy-octane is 43.5 g., corresponding to a molar yield of 57%, based on the hydroperoxide consumed. Consequently, by employing a different catalyst, it is possible to use a much lower reaction temperature, a much shorter reaction time, and of most importance, an increased yield of from 19 g. to 43.5 g. can be obtained.

EXAMPLE XIII

This example, like the preceding example, demonstrates the unexpected advantages of the present invention.

Utilizing o-dichlorobenzene as the solvent, there is prepared a solution containing 1.9 mols/l. of ethyl benzene hydroperoxide, 3.8 mols/l. of octene-1, and 2 g./l. of molybdic anhydride. The solution is heated to 100° C. for 10 hours. By this reaction, 80% of the hydroperoxide is consumed, and the selectivity to 1,2-epoxy-octane is 75% in relationship to the hydroperoxide consumed.

By repeating the last experiment, but replacing the molybdic anhydride with piperidine paramolybdate in the same weight, there is obtained in a period of 35 minutes, as compared to 10 hours, the same rate of conversion of the hydroperoxide, and of even more importance, the selectivity to the epoxide is 95%. Thus, the reaction time is reduced to about 1/20, and the yield is increased 20%. This constitutes a most remarkable and unexpected advance in the art.

As it may be seen from the description and the examples, the invention resides neither in the epoxidation of a particular type of olefinic compound nor in a particular type of epoxidation agent or in particular operating conditions. These are well known in the art and do not need to be described in details.

The invention resides only in the use of a particular catalyst namely a salt of a nitrogenous base with a molybdic, tungstic or vanadic acid or an heteropolyacid containing these elements.

By "nitrogenous base" it is understood, as above mentioned in the description, mono or polyamines, quaternary ammonium bases or heterocyclic nitrogenous bases. A list of preferred heterocyclic nitrogenous bases has been already given.

As monoamines and quaternary ammonium salts we can use compounds corresponding to the formulae

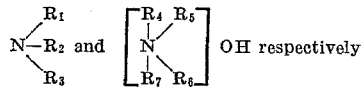 respectively wherein $R_1$, $R_4$, $R_5$, $R_6$ and $R_7$ are alkyl, cycloalkyl or aryl radicals having each from 1 to 30 carbon atoms, $R_2$ and $R_3$ each are hydrogen or alkyl, cycloalkyl or aryl radicals having from 1 to 30 carbon atoms, OH being the hydroxyl group.

As polyamines, there are preferably intended aliphatic, cycloaliphatic or aromatic hydrocarbons having from 2 to 30 carbon atoms wherein two to six hydrogen atoms on distinct carbon atoms are substituted by $NH_2$ groups.

More preferably polyamines are alkylenediamines of 2-30 carbon atoms and arylenediamines of 6-12 carbon atoms wherein the amino groups each are unsubstituted or substituted by 1 or 2 alkyl groups of 1-10 carbon atoms.

Other bases are pyridine, quinoline, pyrrolidine, piperidine, piperazine, morpholine, and alkanolamines of 2-9 carbon atoms, 1-3 hydroxy groups and 1-3 amino groups.

The preceding examples can be repeated with similar success by substituting the generically and specifically described reactants operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a substantially anhydrous liquid phase process for the epoxidation of an olefinic compound of at least three carbon atoms, which comprises reacting an organic hydroperoxide with said olefinic compound in the presence of a preformed catalyst, the improvement comprising employing as said catalyst a salt of an acid selected from the group consisting of molybdic acid, tungstic acid, and vanadic acid with an organic nitrogenous base selected from the group consisting of a monoamine, a polyamine, a heterocyclic nitrogenous base, and a quaternary ammonium base of the formula:

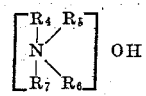

wherein $R_4$, $R_5$, $R_6$ and $R_7$ are alkyl, cycloalkyl, or aryl radicals of 1 to 30 carbon atoms, OH being the hydroxyl group.

2. A process as defined by claim 1 wherein the acid from which the catalyst is prepared is a mono or polyacid of molybdenum, tungsten or vanadium.

3. A process as defined by claim 1 wherein the acid from which the catalyst is prepared is an heteropolyacid of molybdenum, tungsten or vanadium.

4. A process as defined by claim 1 wherein the polyamine is an aliphatic, cycloaliphatic or aromatic hydrocarbon having from 2 to 30 carbon atoms wherein two to six hydrogen atoms on distinct carbon atoms are substituted by $NH_2$ groups.

5. A process as defined by claim 1 wherein the epoxidation temperature is 0–210° C.

6. A process as defined in claim 1 wherein the organic hydroperoxide is produced in situ with molecular oxygen.

7. A process as defined by claim 1 wherein the monoamine corresponds to the formula:

wherein $R_1$ is alkyl, cycloalkyl or aryl having from 1 to 30 carbon atoms, and $R_2$ and $R_3$ are hydrogen or alkyl, cycloalkyl or aryl having from 1 to 30 carbon atoms.

8. In a liquid phase process for the epoxidation of an olefinic compound of at least three carbon atoms, which comprises reacting an hydrocarbon hydroperoxide with said olefinic compound in the presence of a catalyst, the improvement comprising employing as said catalyst a salt of an acid selected from the group consisting of a mono-, poly- or heteropoly-acid of molybdenum, tungsten or vanadium with a nitrogenous base selected from the group consisting of (a) an amine of formula

wherein
  R₁ is alkyl, cycloalkyl or aryl having from 1 to 30 carbon atoms, and
  R₂ and R₃ are hydrogen or alkyl, cycloalkyl or aryl having from 1 to 30 carbon atoms;
(b) an alkylenediamine of 2–30 carbon atoms,
(c) an arylenediamine of 6–12 carbon atoms,
(d) pyridine,
(e) quinoline,
(f) pyrrolidine,
(g) piperidine,
(h) piperazine,
(i) morpholine, and
(j) alkanolamines of 2–9 carbon atoms, 1–3 hydroxy groups and 1–3 amino groups.

9. A process as defined by claim 8 wherein the catalyst is selected from the group consisting of:
  pyridine tetramolybdate
  piperidine dimolybdate
  diethylamine paramolybdate
  piperidine paramolybdate
  hexadecylamine trimolybdate
  piperidine trimolybdate
  piperidine tetramolybdate
  piperidine metavanadate
  pyridine metavanadate
  monomethylamine heptatungstate
  piperidine heptatungstate
  toluidine pentatungstate
  pyridine phosphotungstate
  quinoline molybdotungstate
  piperidine boromolybdate
  diethanolamine silicomolybdate
  piperazine tungstovanadate
  triethylamine selenotungstate, and
  cyclohexylamine thiomolybdate.

10. A process as defined by claim 1, wherein the organic hydroperoxides containing from 1 to 30 carbon atoms per molecule are hydroperoxides of hydrocarbons or hydroperoxides of alcohols.

11. A process as defined by claim 10, wherein the hydroperoxides of hydrocarbons are selected from the group consisting of hydroperoxides of aliphatic, cycloaliphatic and alkylaromatic hydrocarbons.

12. A process as defined by claim 1, wherein the olefinic compound is selected from the group consisting of:
  aliphatic olefins,
  cycloolefins,
  alkyl and alkenyl cycloolefins,
  alkenylaryl hydrocarbons,
  compounds having a plurality of olefinic conjugated and unconjugated double bonds, and
  olefinic alcohols.

13. A process as defined by claim 1, wherein said catalyst is selected from the group consisting of
  pyridine tetramolybdate,
  piperidine dimolybdate,
  diethylamine paramolybdate,
  piperidine paramolybdate,
  hexadecylamine trimolybdate,
  piperidine trimolybdate,
  piperidine tetramolybdate,
  piperidine metavanadate,
  pyridine metavanadate,
  monomethylamine heptatungstate,
  piperidine heptatungstate,
  toluidine pentatungstate,
  pyridine phosphotungstate,
  quinoline molybdotungstate,
  piperidine boromolybdate,
  diethanolamine silicomolybdate,
  piperazine tungstovanadate,
  triethylamine selenotungstate,
  cyclohexylamine thiomolybdate, and
  benzyltrimethylammonium dimolybdate.

14. A process as defined by claim 1, wherein said catalyst is pyridine molybdate or piperidine molybdate.

15. A process as defined by claim 8, wherein said catalyst is pyridine molybdate or piperidine molybdate.

References Cited

UNITED STATES PATENTS

| | | | |
|---|---|---|---|
| 3,156,709 | 11/1964 | Allan | 260—348 |
| 3,122,569 | 2/1964 | Kaman | 260—348.5 |
| 3,259,638 | 7/1966 | Allison | 260—348.5 |
| 3,293,269 | 12/1966 | Wolgemuth | 260—348.5 |
| 3,351,635 | 11/1967 | Kollar | 260—348.5 |
| 3,350,422 | 10/1967 | Kollar | 260—348.5 |

FOREIGN PATENTS 1,374,882  8/1964  France.

NORMA S. MILESTONE, Primary Examiner

U.S. Cl. X.R.

260—80, 242, 270, 299, 326.8, 429